United States Patent [19]
Iwata et al.

[11] Patent Number: 5,646,649
[45] Date of Patent: Jul. 8, 1997

[54] PORTABLE INFORMATION TERMINAL

[75] Inventors: Yuji Iwata; Jiro Nakasu; Makoto Takemoto, all of Kamakura, Japan

[73] Assignee: Mitsubishi Denki Kabushiki Kaisha, Tokyo, Japan

[21] Appl. No.: 515,955

[22] Filed: Aug. 16, 1995

[30] Foreign Application Priority Data

Aug. 23, 1994 [JP] Japan .................................. 6-198601

[51] Int. Cl.$^6$ ........................................... G09G 5/00
[52] U.S. Cl. .................. 345/173; 345/169; 455/575
[58] Field of Search ....................... 345/168, 169, 345/173, 901, 905, 156; 341/22, 23; 348/734; 178/18, 19; 379/59, 58, 110, 368–370, 102, 422, 428, 433; 455/89; 361/680, 681; 235/1 D, 145 R, 146; 364/188, 189, 708.01, 709.1, 709.11–709.16

[56] References Cited

U.S. PATENT DOCUMENTS

| | | | |
|---|---|---|---|
| 4,703,160 | 10/1987 | Narishima et al. ............. 235/1 D |
| 5,303,291 | 4/1994 | Takagi et al .................. 379/433 |
| 5,327,584 | 7/1994 | Adachi et al. .................... 455/89 |
| 5,335,273 | 8/1994 | Takagi et al. ................... 379/433 |
| 5,337,346 | 8/1994 | Uchikura ......................... 379/58 |
| 5,367,453 | 11/1994 | Capps et al. . | |
| 5,414,444 | 5/1995 | Britz ............................. 345/156 |
| 5,422,656 | 6/1995 | Allard et al. ................... 345/173 |

FOREIGN PATENT DOCUMENTS

| | | | |
|---|---|---|---|
| 404259156 | 9/1992 | Japan ........................... 379/422 |
| 2275587 | 8/1994 | United Kingdom ............ 379/428 |

*Primary Examiner*—Regina D. Liang
*Attorney, Agent, or Firm*—Wolf, Greenfield & Sacks, P.C.

[57] ABSTRACT

In a unit body of a portable information terminal is assembled a display and a pressure-sensitive input device overlying the display. An opening and closing cover is attached to the unit body for covering the pressure-sensitive input device. An operating button device provided in the cover exposes, when the cover is closed, its operating surface from the surface of the cover. The operating button device exerts a pressing force applied to the operating surface onto the surface of the pressure-sensitive input device. Thus, with the cover closed, major function entry or data entry can be carried out.

12 Claims, 8 Drawing Sheets

PORTABLE INFORMATION TERMINAL

BACKGROUND OF THE INVENTION

1. Field of the Invention

The present invention relates generally to a portable information terminal and, more particularly, to a portable information terminal unit of a type in which a display and a pressure-sensitive input device overlying the display are assembled in its unit body and in which a cover for covering the pressure-sensitive input device is attached to the unit body in a freely openable and closable manner.

2. Description of the Related Arts

Hitherto known as equipment in the field of portable information terminals are products such as "ZAURUS PI-4000" (SHARP Co.) or "NEWTON" (Apple Computer, Inc.) having function of personal information management. In each of these products its unit body includes a liquid crystal display and a transparent pressure-sensitive input device laid over the surface of the liquid crystal display. The pressure-sensitive input device allows the operator to enter characters by tracing its surface with an input pen and to enter a specific function by operationally pressing a function pad appearing on the surface thereof.

The unit body is provided with an opening and closing cover attached thereto for covering the pressure-sensitive input device, so that the pressure-sensitive input device would be protected during out-of-operation. However, there has never existed such products that make it possible to execute the data entry with the input pen or the function pad while the cover is closed. Accordingly, irrespective of how frequent a specific function is used, the cover always must be opened whenever the pressure-sensitive input device is intended to be operated or pressed. Furthermore, when using the input pen in place of the pressing operation with a finger, the frequent pen entry would subject the pressure-sensitive surface of the pressure-sensitive input device to accelerated deterioration.

A remote controller of a video tape recorder is one of the information equipment with a cover attached. For instance, the remote controller of a video tape recorder VZ-H330 supplied by SANYO ELECTRIC CO. comprises, as shown in FIG. 7, a unit body 103 including a plurality of key pads 101 and a display screen 102. A selective operation of the key pads 101 allows the operator to enter a variety of functions into the main videotape recorder remote from the controller. For instance, the pressing of an UP channel key pad 104 enables the television channel to sequentially shift up, whereas the pressing of a DOWN key pad 105 enables the channel to sequentially shift down.

The unit body 103 is provided with an opening and closing cover 106 attached thereto for covering the key pads 101 and the display screen 102. As shown in FIG. 8, the cover 106 is provided with an UP channel button 107 and a DOWN channel button 108, which are both exposed on the surface of the cover 106 in a state where the cover 106 is closed. Upon pressing the UP channel button 107 with the cover 106 closed, the base end of the button 107 mechanically depresses the UP channel key pad 104 of the unit body 103, allowing the channel to shift up. And also, the pressing of the DOWN channel button 108, with the cover 106 closed, allows the channel to shift down. In this manner, only frequently operated buttons are exposed on the surface of the closed cover 106, which prevents the key pads covered by the cover 106 from being erroneously or unexpectedly operated. Of course, when the cover 106 is opened, any further various functions can be achieved.

However, in such information equipment with a cover, the operating buttons on the cover are mechanically connected to the corresponding key pads of the unit body, which requires the strict alignment between the bases of the operating buttons and the corresponding key pads. This means that the positions of the cover side operating buttons depend to some extent on the positions of the unit body side key pads. Accordingly, the variation of the design can be restricted and the operability of the information equipment cannot be improved any more. In addition, some measures are needed for causing a pressing force from the cover side operating button to uniformly act on the unit body side key pads so as to ensure reliable actions of the key pads. Furthermore, even in the case of exchange of the covers, since the unit body side key pads only achieve predetermined functions, the versatility would be low.

SUMMARY OF THE INVENTION

It is therefore an object of the present invention to provide a portable information terminal allowing, with its cover closed, the entry of functions which may often be used.

Another object of the present invention is to provide a portable information terminal capable of arbitrarily positioning cover side operating buttons and of readily exchanging covers having different specifications.

According to the first aspect of the present invention, a portable information terminal comprising: a unit body including a display and a pressure-sensitive input device overlying the display, the display and the pressure-sensitive input device assembled in the unit body; a cover for opening and closing attached to the unit body for covering the pressure-sensitive input device; and an operating button device provided in the cover for exposing its operating surface from the surface of the cover when the cover is closed, the operating button device causing a pressing force from the operating surface to act on the surface of the pressure-sensitive input device.

With the above structure, the cover protects the surface of the pressure-sensitive input device when the cover is brought into its closed position. In this condition, when a pressing force is applied to the operating surface exposed from the surface of the cover, the operating button device exerts the pressing force onto the surface of the pressure-sensitive input device. Thus, in spite of the closed state of the cover, the operating button device allows desired functions or data to be entered through the pressure-sensitive input device. The allocation of frequently-used functions to the operating button device would further improve the functionality of the portable information terminal.

If the cover is removably attached to the unit body by means of a hinge mechanism, the cover could readily be replaced with another one. With such structure, the maintenance can be facilitated, further, differently specified covers can be attached to the unit body. In this case, with the cover removed, an input pen or fingers may be used to perform data or function entry to the pressure-sensitive input device.

The hinge mechanism may include: a pair of coaxial holes provided in a recess formed in the unit body, the pair of coaxial holes facing to each other at opposite sides of the recess; a pair of coaxial mounting shafts provided on a support which is provided on the cover, the support adapted to be received in the recess, the pair of coaxial mounting shafts being displaceable between a mounting position where the shafts advance into the corresponding coaxial holes and a removing position where the shafts retreat from the corresponding coaxial holes; and biasing means for urging the pair of mounting shafts away from each other. With this hinge mechanism, by fitting the mounting shafts into the coaxial holes with the aid of the biasing force by the biasing means, the cover can easily be attached to the unit body. On the contrary, if the mounting shafts are displaced closer to each other against the biasing force of the biasing means, the cover will easily be disengaged from the unit body.

Preferably, a CPU may be connected to that pressure-sensitive input device for changing entry modes of the pressure-sensitive input device. Consequently, upon the replacement of a cover with another one having a differently specified operating button device, the portable information terminal could promptly and easily be complied with the new cover by merely changing a software to be installed in the CPU, and the like. In addition, by means of the software installed in the CPU, the dimensions and position for each of entry areas can be optionally set in the pressure-sensitive input device, thereby eliminating the necessity to strictly position the operating button device relative to the cover.

Preferably, a CPU may be connected to the display for changing display modes of the display. With this arrangement, in the case where the dimensions and position of the entry areas are changed on the pressure-sensitive device, the display of information can be achieved in accordance with such change of dimensions and position.

A detection switch may be interposed between the unit body and the cover for detecting the closed state of the cover. The CPU could change over the display mode in response to the detection of the closed state, so that it is made possible to change the display of information appearing on the screen of the display depending on whether the cover is closed or opened. Assuming that the cover is provided with a display window, this would also make it possible, upon the closing of the cover, to cause the extent of the display area to coincide with the display window and, upon the opening of the cover, to enlarge the display area up to a full scale of the screen.

In response to the detection result of the detection switch, preferably, the CPU changes the entry modes of the pressure-sensitive input device, thereby allowing the alteration of the entry areas of the pressure-sensitive input device depending on whether the cover is opened or closed.

Preferably, in the operating button device, the resilient member may be mounted on a portion with which the surface of the pressure-sensitive input device is brought in contact. Thus, contrary to the case of pen entry, using an input pen whose tip is relatively sharp and hard, the surface of the pressure-sensitive input device is subjected to less damage, bringing about reduced deterioration of the pressure-sensitive input device.

According to a second aspect of the present invention, a portable information terminal comprising: a unit body including a display and a pressure-sensitive input device overlying the display, the display and the pressure-sensitive input device assembled in the unit body; a cover for opening and closing attached to the unit body for covering the pressure-sensitive input device; and a protrusion provided on the cover for exerting, when the cover is closed, a pressing force onto the surface of the pressure-sensitive input device.

With the above structure, after previously registering in the CPU or the like a specific positional pattern of the protrusion, desired information can be displayed only when the actual positional pattern coincides with the specific positional pattern. Therefore, this positional patterns serve as a personal identification or a password. Allocation of this positional pattern to individual operators would provide a custom made cover dedicated to a specific person.

Preferably, the cover may include a pen receptacle for receiving an input pen provided with the protrusion. While the cover is closed, the protrusion of the input pen received in the pen receptacle comes into contact with the surface of the pressure-sensitive input device, thereby to exert the pressing force onto the surface of the input device. This would also provide an arrangement in which the portable information terminal does not work until a specific input pen is mounted on the cover.

A resilient member may be mounted on the top of the protrusion for coming into resilient-contact with the surface of the pressure-sensitive input device. Contrary to the case of the pen entry using an input pen whose tip is relatively sharp and hard, the surface of the pressure-sensitive input device is subjected to less damage, leading to suppressed deterioration of the pressure-sensitive input device.

According to the third aspect of the present invention, a portable information terminal comprising: a unit body including a display and a pressure-sensitive input device overlying the display, the display and the pressure-sensitive input device assembled in the unit body; and a cover for opening and closing attached to the unit body for covering the pressure-sensitive input device; wherein the cover is arranged in such a manner that when the cover is closed, the back of the cover is brought into intimate-contact with the surface of the pressure-sensitive input device.

With such arrangement, even in the case of the cover provided with an operating button device, the operating button device would be stably supported by the cover, at the portion where the operating button device contacts with the pressure-sensitive input device. As a result, the pressing force of the operating button device is reliably transmitted to the pressure-sensitive input device.

These and other objects, features and advantages of the present invention will become more apparent from the following detailed description of the preferred embodiments when taken in conjunction with the accompanying drawings.

DESCRIPTION OF THE PREFERRED EMBODIMENTS

A preferred exemplary embodiment of the present invention will now be described with reference to the accompanying drawings.

Figure 1:
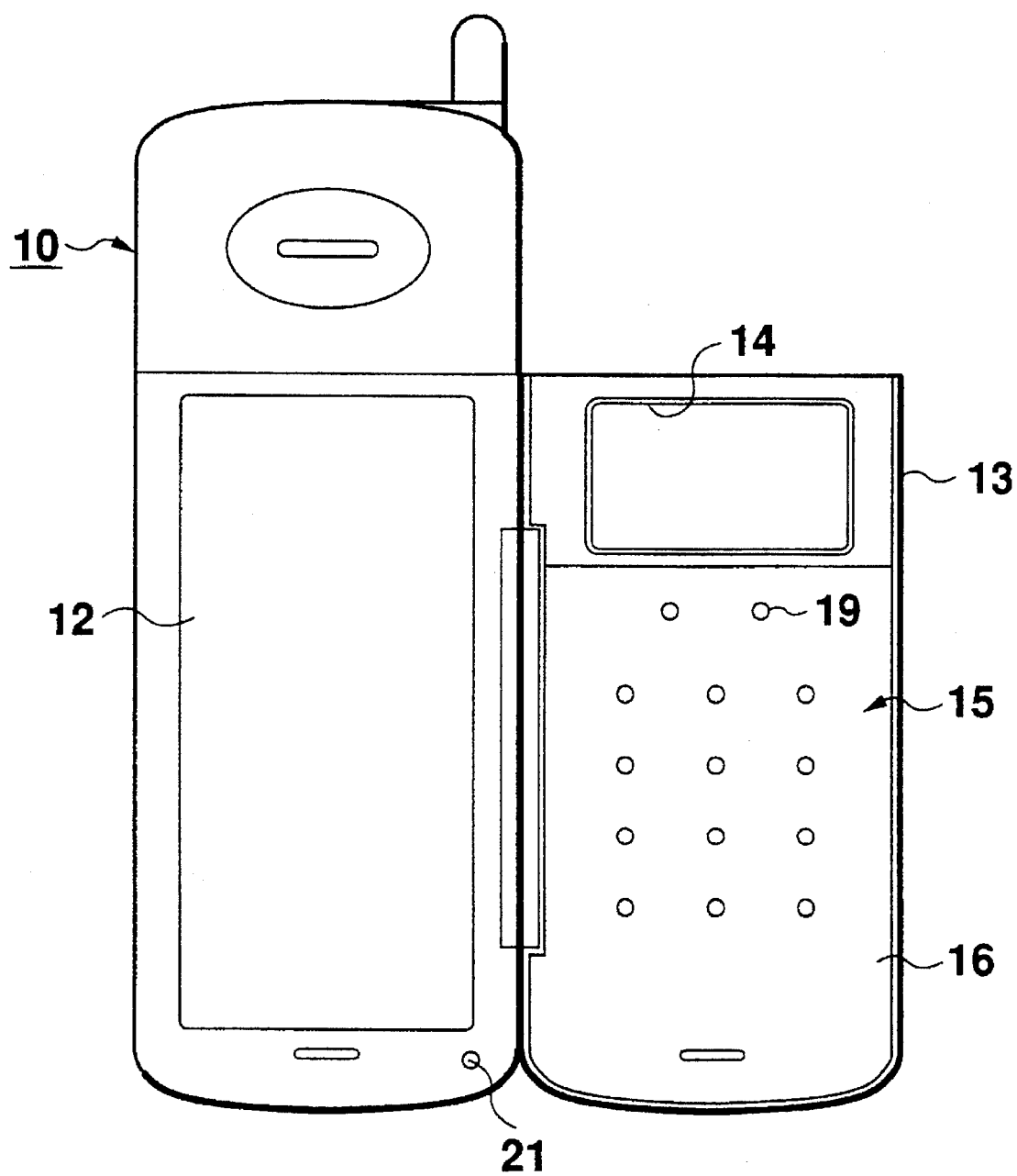
FIG. 1 is a general front elevational view of a portable information terminal, with the cover opened, according to the first embodiment of the present invention.

FIG. 1 illustrates a general configuration of a portable information terminal according to the first embodiment of the present invention. This portable information terminal effects, for instance, the functions of a personal information management and a personal digital assistants. The portable information terminal comprises a unit body 10, which includes a liquid crystal display 11 (See FIG. 3) and a transparent pressure-sensitive input device 12 overlying the surface of the liquid crystal display 11. A screen of the liquid crystal display 11 can be perceived through the transparent pressure-sensitive input device 12. The operator can enter character data by tracing the surface of the pressure-sensitive input device 12 with an input pen or can enter specific functions or data by operationally pressing the surface of the pressure-sensitive input device 12 in accordance with a function indicator appearing on the liquid crystal display 11.

The unit body 10 is provided with a cover 13 turnably attached thereto for opening and closing. The cover 13 may cover the surface of the pressure-sensitive input device 12. A display window 14 is provided on the cover 13. Through the display window 14, the operator can perceive a display appearing on the screen of the liquid crystal display 11 even when the cover 13 is closed. A transparent synthetic resin plate may be fitted in the display window 14. While the cover 13 is closed, the pressure-sensitive input device 12 is protected overall by the cover 13.

Figure 2:
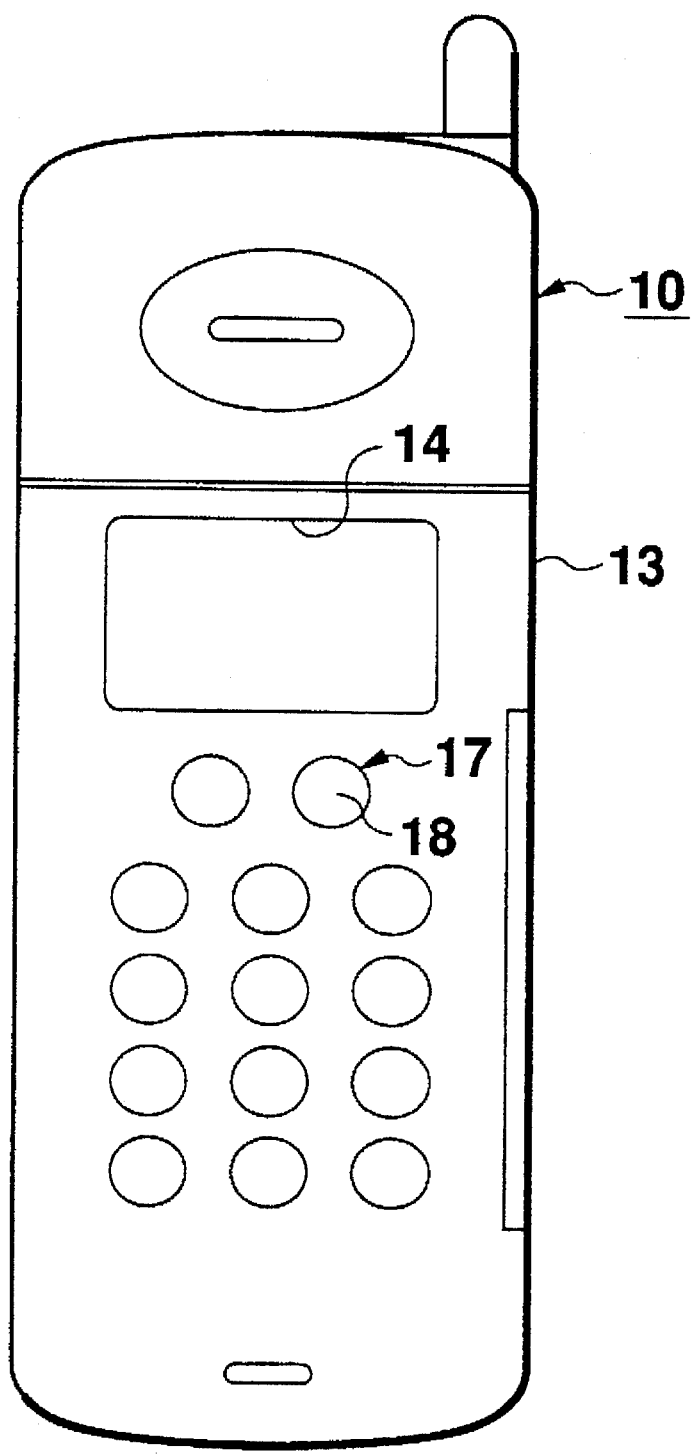
FIG. 2 is a general front elevational view of the portable information terminal, with the cover closed.
Figure 3:
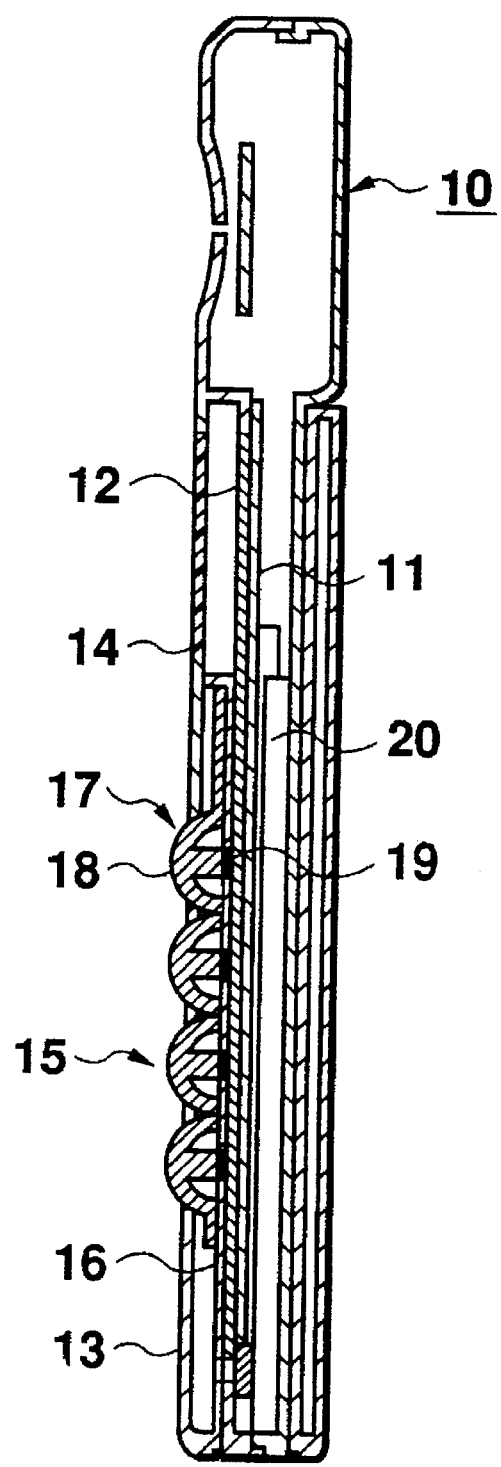
FIG. 3 is a sectional view of the portable information terminal, with the cover closed.

An operating button device 15 is mounted on the cover 13 from its rear side. Referring also to FIGS. 2 and 3, the operating button device 15 comprises a support 16 constituting the back of the cover 13, and a plurality of switch buttons (pads) 17 carried by the support 16 for advancing and retreating movements. The switch button 17 includes an operating surface 18 to be exposed from the surface of the cover 13 when the cover 13 is closed, and a contact portion which comes into contact with the surface of the pressure-sensitive input device 12 upon the advancement of the switch button 17. At the tip end of the contact portion 19, a rubber is mounted as a resilient member for coming into contact with the surface of the pressure-sensitive input device over a relatively wide area. When a pressing force is applied on the operating surface 18 of a selected one of the switch buttons 17 by the operator, the switch button 17 advances against its own resilient force, thereby to urge the contact portion 19 against the surface of the pressure-sensitive input device 12. Through this operation, functions or data corresponding to the switch buttons 17 are entered into the pressure-sensitive input device 12. It will be appreciated that with no operating force the switch buttons 17 are retained by their own resilient forces at positions where they are not permitted to enter functions or data into the pressure-sensitive input device 12.

As is apparent from FIG. 3, a CPU 20 incorporated in the unit body 10 is connected to the liquid crystal display 11 and the pressure-sensitive input device 12. The CPU 20 allows the screen of the display 11 to be divided into a plurality of blocks, each block being allocated a different function indicator. To this end, software is installed within the CPU 20 for laying out the function indicators on the screen of the liquid crystal display 11. This software makes it possible to change display modes of the liquid crystal display 11. Correspondingly with the change in the function indicators, within the CPU 20 is also installed software for implementing the function entry or data entry corresponding to the function indicator selected. This software serves to change entry modes of the pressure-sensitive input device 12. Although this embodiment employs a single CPU, the liquid crystal display and the pressure-sensitive input device may be individually provided with their respective CPU's.

Additionally, between the unit body 10 and the cover 13, as seen in FIG. 1, a microswitch 21 is disposed, acting as a detection switch for detecting the closed condition of the cover 13. The microswitch 21 has a shaft adapted to be retracted by a pressing force of the cover 13 at the time of closing the cover 13, thereby detecting the closed condition of the cover 13.

The operation of the portable information terminal according to the first embodiment will now be described below. Assuming a case, for instance, where the cover 13 is closed to protect the surface of the pressure-sensitive input device 12, the shaft of the microswitch 21 is retracted and the closed condition of the cover 13 is detected. In response to a detection signal from the microswitch 21, the CPU 20 controls the liquid crystal display 11 to display predetermined information on a screen area corresponding to the display window 14. At the same time, the CPU 20 controls the pressure-sensitive input device 12 to allow the portions corresponding to the contact portions 19 of the switch buttons 17 to have predetermined entry functions.

When the operator presses the operating surface 18 of the switch button 17, the pressing force is transmitted to the surface of the pressure-sensitive input device 12, to accomplish a desired function entry or data entry. Such allocation of only frequently-used functions to the switch buttons 17 will enable the portable information terminal to work fully even when the cover 13 is closed. Contrary to the case of pen entry with a pen whose tip is relatively sharp and hard, the resilient member having a relatively wide contact area comes into contact with the surface of the pressure-sensitive input device 12, thereby making it possible to reliably press the surface of the pressure-sensitive input device 12 and to subject the surface of the pressure-sensitive input device 12 to less damage, which will reduce deterioration of the device 12. Furthermore, the software installed in the CPU 20 allows the position and dimensions of the entry area of the pressure-sensitive input device 12 to be optionally set, thus eliminating the necessity to strictly position the switch buttons 17 attached to the cover 13. In addition, mere change of the software to be installed will make it possible to rapidly cope with the change in functions or change in dimensions of the entry area attendant on the exchange of the covers 13.

As is clear from FIG. 3, the cover 13 is arranged in such a manner that when the cover 13 is closed, the back of the cover 13 is brought into intimate contact with the surface of the pressure-sensitive input device 12, which ensures a stable support of the contact portions 19 of the switch buttons 17 by the support 16. As a result, the pressing force acting on the operating surfaces 18 can reliably be transmitted to the contact portion 19.

Assuming that the cover 13 is opened, the shaft of the microswitch 21 springs out and the opened state of the cover 13 is thereby detected. In response to the detection signal from the microswitch 21, the CPU 20 controls the liquid crystal display 11 to enlarge its information display area, thereby providing a screen including an even greater amount of information. The change in entry area attendant on the change in displays may also be achieved by controlling the pressure-sensitive input device 12 with the aid of the CPU 20.

Figure 4:
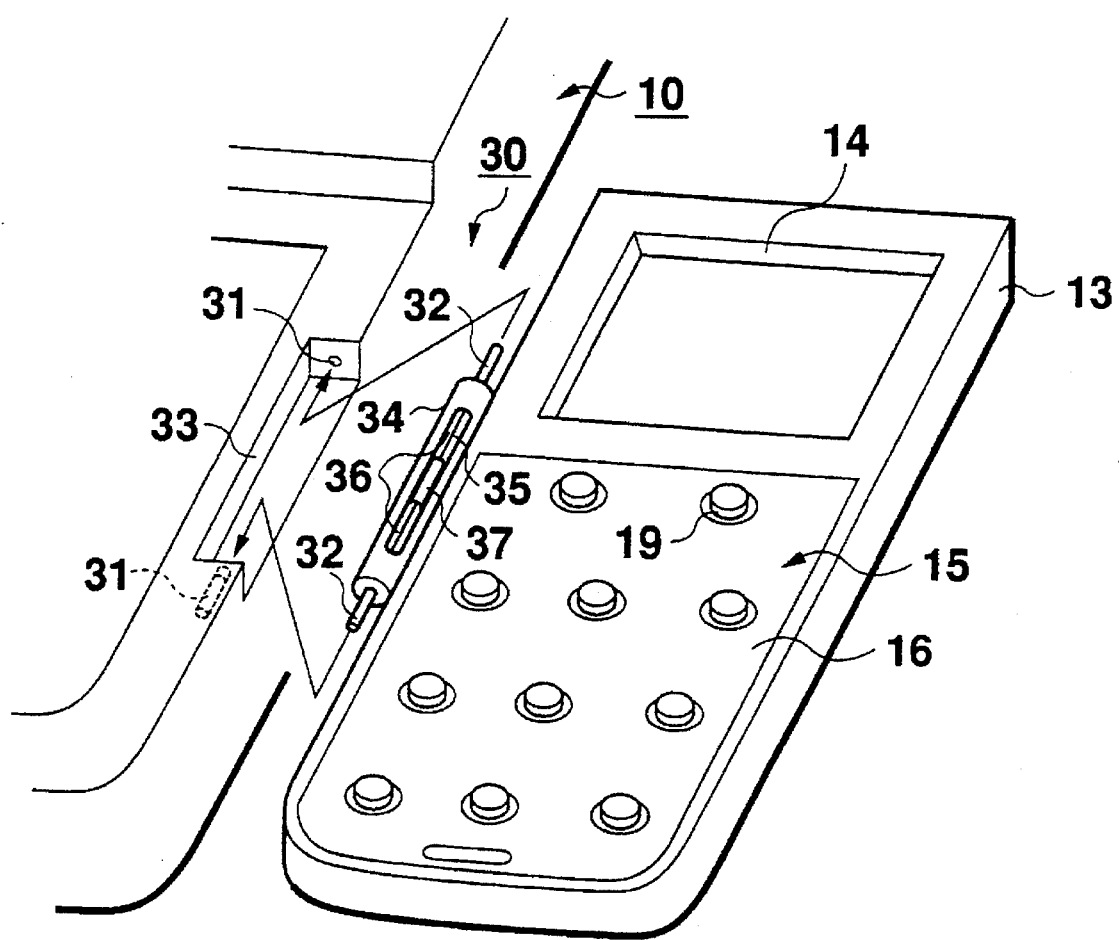
FIG. 4 illustrates a hinge mechanism for coupling the unit body and the cover together, of a portable information terminal according to the second embodiment of the present invention.

FIG. 4 illustrates in part a portable information terminal according to the second embodiment of the present invention. The second embodiment is characterized in that the cover is removably attached to the unit body. The other constituent elements are substantially the same as those of the first embodiment, and hence the corresponding elements are designated by identical reference numerals, of which detailed description will be omitted.

As illustrated in FIG. 4, the cover 13 is attached to the unit body 10 by way of a hinge mechanism 30. The hinge mechanism 30 comprises a pair of coaxial holes 31 and a pair of coaxial mounting shafts 32 which project into the pair of coaxial holes 31.

The coaxial holes 31 are provided in a recess 33 at opposite surfaces facing to each other. The recess 33 is formed in the unit body 10. The cover 13 is integrally provided with a hollow cylindrical support 34 to be received in the recess 33. The mounting shafts 32 are disposed in the hollow portion of the support 34. The support 34 is provided with an opening 35 through which the hollow portion can be exposed. A pair of grips 36 secured to the two mounting shafts 32 projects from the opening 35. By the action of a spring 37 serving as a biasing means interposed therebetween, the two shafts 32 are biased away from each other so that the tip ends of the mounting shafts 32 project outward from the ends of the support 34.

Supposing that the two grips 36 are urged closer to each other against a biasing force of the spring 37, the tip ends of the mounting shafts 32 which have so far projected from the ends of the support 34 will retract into the hollow portion of the support 34. In this state the support 34 is brought into the recess 33 of the unit body 10. The subsequent release of the grips 36 allows the mounting shafts 32 to move in the direction apart from each other by the biasing force of the spring 37, with the result that the tip ends of the mounting shafts 32 project from the ends of the support 34 and enter the coaxial holes 31. The cover 13 is now attached to the unit body 10 for opening and closing. Similar operation also enables the cover 13 to be readily removed from the unit body 10.

With the above structure, the cover 13 can easily be replaced. In this case, with the cover 13 removed, the entry operation may be performed by means of the input pen or fingers.

Figure 5:
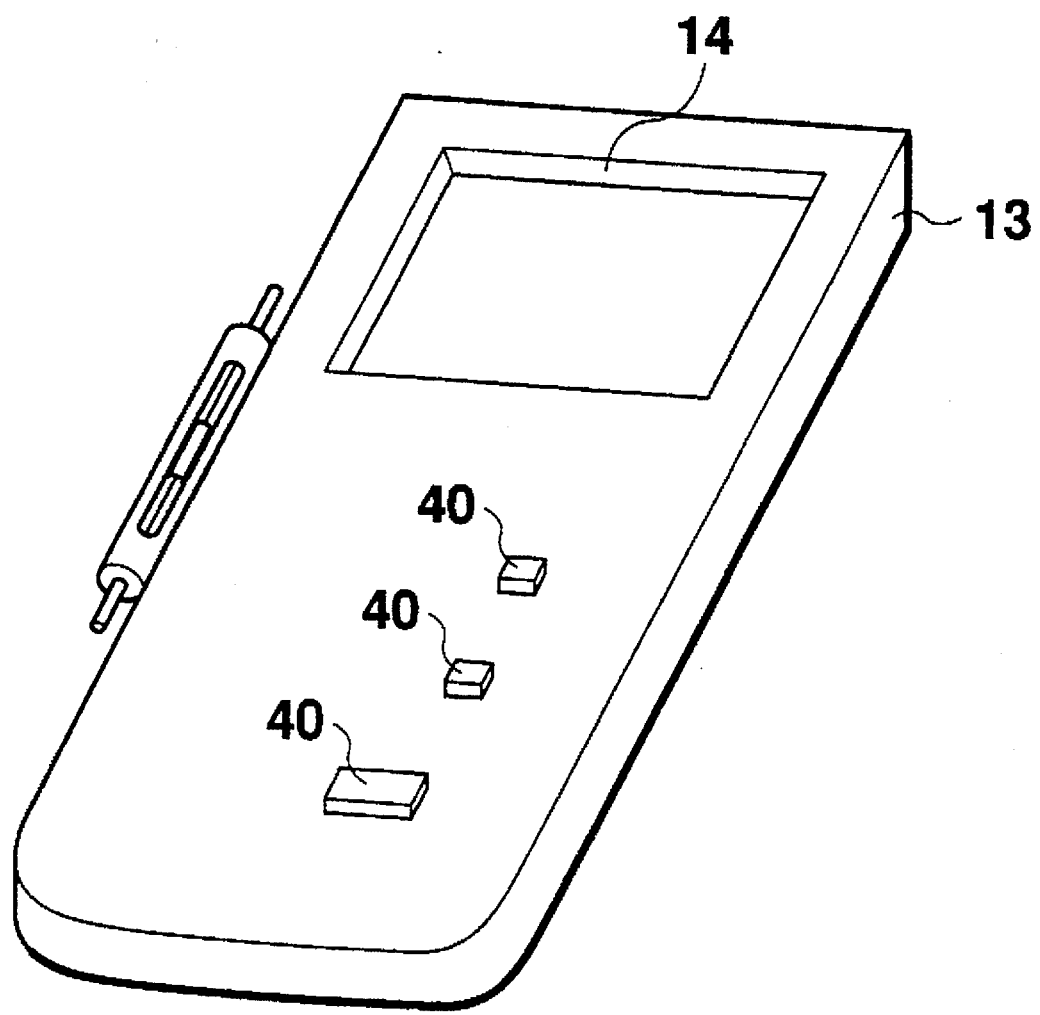
FIG. 5 illustrates the back of a cover, of a portable information terminal according to the third embodiment of the present invention.

FIG. 5 shows a portable information terminal according to the third embodiment of the present invention. The third embodiment is characterized in that the cover is provided with a protrusion serving to exert a pressing force onto the surface of the pressure-sensitive input device when the cover is closed. The other constituent elements are substantially the same as those of the preceding embodiments, and hence the corresponding elements are correspondingly referenced and will not be further detailed.

As shown in FIG. 5, three protrusions 40 are formed on the back of the cover 13 for pressing the surface of the pressure-sensitive input device 12 at specific regions. At the top of each of the protrusions 40, a rubber member is mounted as a resilient member resiliently coming into contact with the surface of the pressure-sensitive input device 12. Upon closing the cover 13, these protrusions 40 is urged against the corresponding regions of the pressure-sensitive input device 12 to allow the information corresponding to the pressed regions to be displayed through the display window 14.

With such structure, by previously registering a specific positional pattern of the protrusions 40 in the CPU 20, desired information can be displayed only when an actual positional pattern coincides with the specific positional pattern. Thus, this positional pattern functions as a personal identification or a password. The allocation of positional patterns to individual operators makes it possible to provide a custom made cover 13 dedicated to a specific person. In this case, the above-described operating button device may be provided in cooperation with the protrusions.

Figure 6:
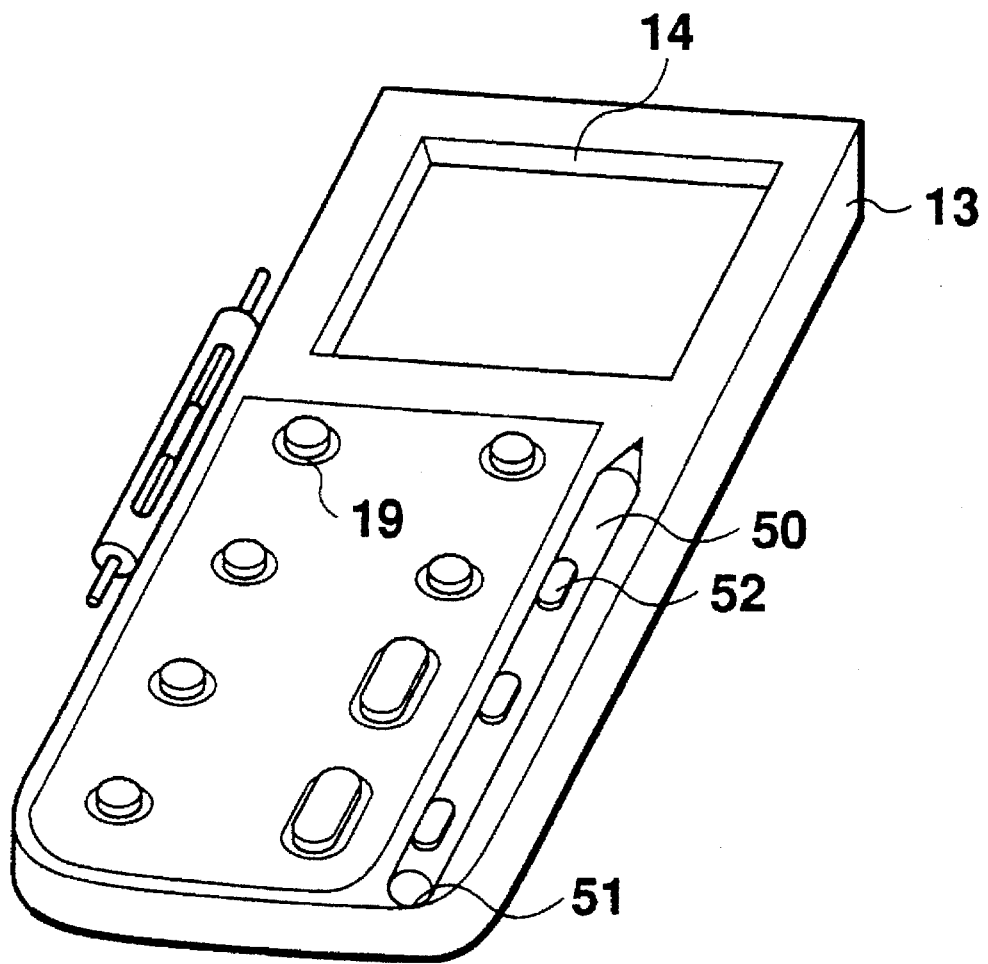
FIG. 6 illustrates the back of a cover, of a portable information unit according to the fourth embodiment of the present invention.
Figure 7:
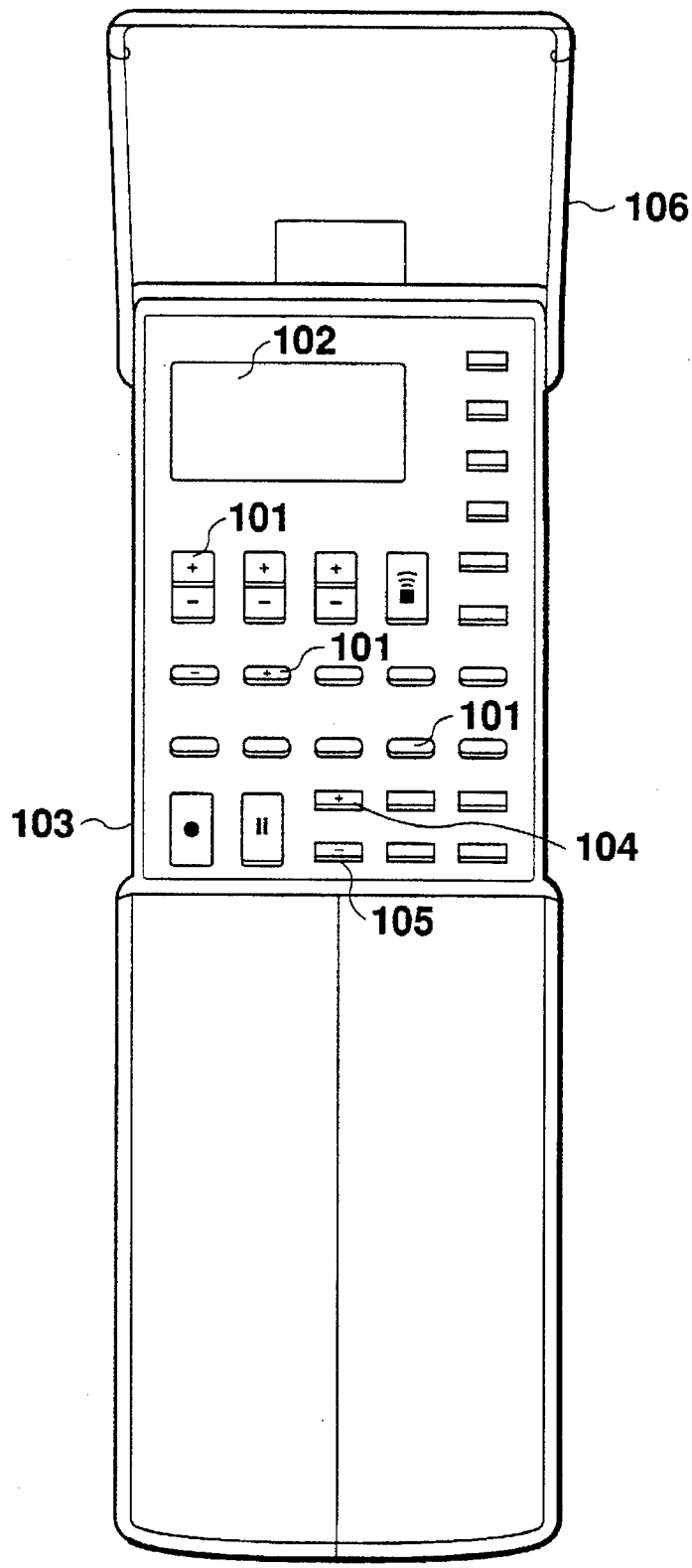
FIG. 7 is a general front elevational view of a remote controller, with the cover opened, of a video tape recorder according to the prior art.
Figure 8:
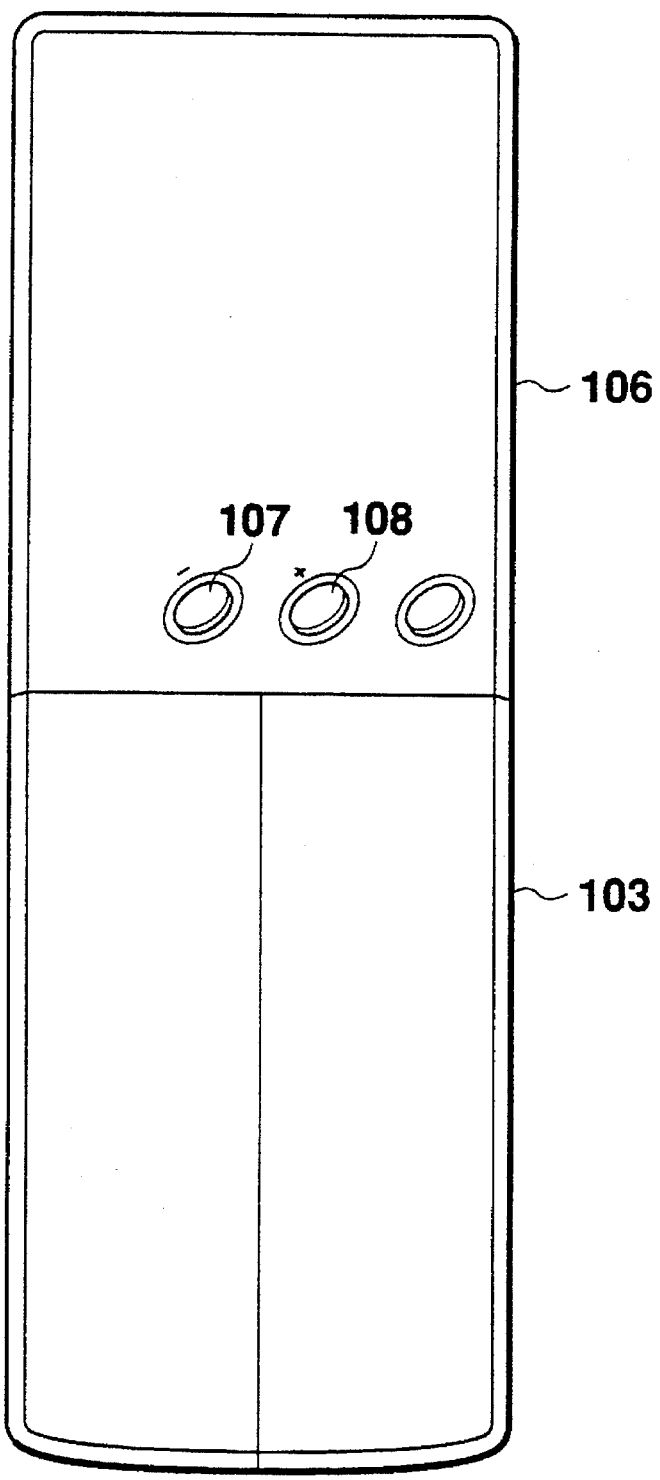
FIG. 8 is a general front elevational view of the remote controller, with the cover closed.

FIG. 6 shows a portable information terminal according to the fourth embodiment of the present invention. The fourth embodiment is characterized in that an input pen is provided with the above-described protrusions, and the input pen is received within the cover to exert a pressing force onto the pressure-sensitive input device when the cover is closed.

As shown in FIG. 6, the back of the cover 13 is provided with a pen receptacle 51 for receiving an input pen 50. The input pen 50 has a surface on which three protrusions 52 are formed for pressing specific regions of the pressure-sensitive input device 12. At the tap of each of the protrusions 52, a rubber member is mounted as a resilient member coming into resilient-contact with the surface of the pressure-sensitive input device 12. Upon closing of the cover 13, the protrusions 52 of the input pen 50 received in the pen receptacle 51 are brought into contact with the surface of the pressure-sensitive input device 12 to exert a pressing force onto the surface thereof. Accordingly, without a specific input pen to be mounted, the portable information terminal is adapted not to work.

What is claimed is:

1. A portable information terminal comprising:
   a unit body including a display and a pressure-sensitive input device overlying said display, said display and said pressure-sensitive input device being assembled in said unit body;
   said pressure-sensitive input device having a pressure-sensitive surface;
   a cover pivotally attached to said unit body for covering said pressure-sensitive device;
   an operating button device provided in the cover, an operating surface of the operating button device being exposed from a surface of the cover when the cover is in a closed position, the operating button device exerting a pressing force applied to said operating surface onto the pressure-sensitive surface;
   a detection switch provided between said unit body and said cover for detecting a closed state of said cover; and
   a CPU provided in the terminal for changing entry modes of said pressure-sensitive input device when the detection switch detects the closed state, wherein
   closing operation of said cover causes a change-over of operations for the terminal, wherein:
   the cover has a pen receptacle formed therein;
   the terminal further includes an input pen having a protrusion thereon, and
   said input pen being received in said pen receptacle, whereby when said cover is in the closed position, the protrusion is brought into contact with the pressure-sensitive surface.

2. A portable information terminal according to claim 1, wherein said cover is removably attached to said unit body by way of a hinge mechanism.

3. A portable information terminal according to claim 2, wherein said hinge mechanism includes:
   a recess defined in the unit body, said recess having a first surface and a second surface opposite the first surface, the first surface having a first hole and the second surface having a second hole, the first and second holes being coaxial to each other;
   a support provided on the cover, the support to be received in the recess;

a pair of coaxial mounting shafts provided on the support, each mounting shaft being displaceable between a mounting position and a removing position;

each mounting shaft to be received by one of the holes, respectively, when in the mounting position and each mounting shaft spaced apart from the respective hole when in the removing position; and biasing means for urging each coaxial mounting shaft away from each other.

4. A portable information terminal according to claim 3, wherein the biasing means comprises a spring.

5. A portable information terminal according to claim 2, wherein said hinge mechanism comprises:

a recess defined in the unit body, said recess having a first surface having a first hole;

a support provided on the cover, the support to be received in the recess;

a mounting shaft provided on the support, said mounting shaft being displaceable between a mounting position and a removing position;

the mounting shaft to be received by the hole when the mounting shaft is in the mounting position; and biasing means for urging the mounting shaft into the mounting position.

6. A portable information terminal according to claim 5, wherein the biasing means comprises a spring.

7. A portable information terminal according to claim 1, wherein said CPU is connected to said display for changing display modes of said display.

8. A portable information terminal according to claim 7, wherein said CPU changes the display modes of said display when said detection switch detects the closed position of the cover.

9. A portable information terminal according to claim 1, wherein a resilient member is mounted on said operating button device at a portion coming into contact with the surface of said pressure-sensitive input device.

10. A portable information terminal, comprising:

a unit body including a display and a pressure-sensitive input device overlying said display, said display and said pressure-sensitive input device being assembled in said unit body;

said pressure-sensitive input device having a pressure-sensitive surface;

a cover, pivotally attached to said unit body for covering said pressure-sensitive input device; and a protrusion for exerting, when said cover is in a closed position, a pressing force onto the pressure-sensitive surface, wherein:

the cover has a pen receptacle formed therein; and the terminal further includes an input pen having said protrusion thereon, said input pen being received in said pen receptacle, whereby when said cover is in the closed position, the protrusion is brought into contact with the pressure-sensitive surface to exert the pressing force onto the surface of said pressure-sensitive input device.

11. A portable information terminal according to claim 10, wherein said protrusion has a tip; and a resilient member for resiliently coming into contact with the pressure-sensitive surface is mounted on the tip.

12. A portable information terminal according to claim 10, wherein the protrusion is on a back surface of the cover.

* * * * *